(12) United States Patent
Saez

(10) Patent No.: US 6,805,247 B2
(45) Date of Patent: Oct. 19, 2004

(54) BICYCLE LOCKING STAND THAT PREVENTS DAMAGE TO URBAN TREES

(75) Inventor: Manuel Saez, New York, NY (US)

(73) Assignee: NYC Street Tree Consortium, Inc., New York, NY (US)

( * ) Notice: Subject to any disclaimer, the term of this patent is extended or adjusted under 35 U.S.C. 154(b) by 0 days.

(21) Appl. No.: 10/273,279

(22) Filed: Oct. 17, 2002

(65) Prior Publication Data
US 2004/0074851 A1 Apr. 22, 2004

(51) Int. Cl.⁷ .................................................. A47F 7/00
(52) U.S. Cl. ............................ 211/17; 211/22; 211/24
(58) Field of Search ................................ 211/17–24, 5; 248/153, 156, 175; D12/115

(56) References Cited

U.S. PATENT DOCUMENTS

| | | | |
|---|---|---|---|
| 115,531 A | | 5/1871 | Schwagerl |
| 383,824 A | | 5/1888 | Newell |
| 506,675 A | * | 10/1893 | Devore ........................ 211/22 |
| D26,975 S | | 4/1897 | Evans |
| D27,770 S | | 10/1897 | Pine |
| 606,118 A | * | 6/1898 | Bowman ........................ 211/5 |
| 621,072 A | * | 3/1899 | Gregory ........................ 211/5 |
| D32,181 S | | 1/1900 | Pease |
| 698,277 A | * | 4/1902 | Hammond ..................... 211/5 |
| 706,718 A | * | 8/1902 | Bradbury ..................... 211/22 |
| 749,522 A | | 1/1904 | Billy |
| 796,741 A | | 8/1905 | Lloyd |
| 801,325 A | | 10/1905 | Litchfeldt |
| D194,702 S | | 2/1963 | Planeta |
| 3,305,969 A | | 2/1967 | Mattson |
| D232,627 S | | 9/1974 | Rossi |
| D234,587 S | | 3/1975 | Harris |
| D234,758 S | | 4/1975 | Sill |
| 3,934,436 A | | 1/1976 | Candlin |
| 3,994,400 A | | 11/1976 | Graber |
| 4,033,459 A | | 7/1977 | Zach |
| D245,596 S | | 8/1977 | Cohen |
| 4,047,614 A | | 9/1977 | Radek |
| 4,057,182 A | * | 11/1977 | Kolkhorst et al. .......... 224/403 |
| 4,186,576 A | | 2/1980 | Means |
| 4,306,660 A | | 12/1981 | Livingston |
| D262,532 S | | 1/1982 | Levine |
| D263,039 S | | 2/1982 | Richard, Jr. |
| D263,949 S | | 4/1982 | Hooper et al. |
| D264,325 S | | 5/1982 | Griswold |
| D266,557 S | | 10/1982 | Smith |
| 4,371,082 A | | 2/1983 | Hostert |
| D268,084 S | | 3/1983 | Haggard |
| D269,000 S | | 5/1983 | Girard |
| D269,843 S | | 7/1983 | Haggard |
| D270,609 S | | 9/1983 | Haggard |
| D270,894 S | | 10/1983 | Haggard |
| 4,433,786 A | | 2/1984 | Wahl |
| D298,746 S | | 11/1988 | Whitworth |
| D301,217 S | | 5/1989 | Mailhot |
| D302,258 S | | 7/1989 | Kalisch |

(List continued on next page.)

Primary Examiner—Carl D. Friedman
Assistant Examiner—Jennifer E. Novosad
(74) Attorney, Agent, or Firm—Stanley H. Kremen (57) ABSTRACT

A modular bicycle locking stand that provides secure parking of bicycles thereon. This bicycle stand, in its preferred embodiment, is comprised of an upper toroidal member that is securely fastened to a lower semi-toroidal member that is, in turn, securely fastened to two shoes used to firmly anchor the bicycle stand to the ground in an urban setting. The bicycle locking stand thus becomes immobile. The bicycle stand can be used stand-alone or in combination as a plurality of such bicycle stands so as to provide a bicycle parking station in an urban or other setting. A plurality of these bicycle stands can also be used to protect a tree from damage due to parked bicycles by surrounding the tree with a sufficient number of modules to prevent bicycles from leaning against or being attached to the tree. This permits a number of bicycles to be parked in the vicinity of urban planted trees.

29 Claims, 9 Drawing Sheets

U.S. PATENT DOCUMENTS

| | | | |
|---|---|---|---|
| D302,804 S | | 8/1989 | Mailhot |
| D305,010 S | | 12/1989 | Rankin |
| D321,470 S | | 11/1991 | Gerrard |
| 5,065,975 A | * | 11/1991 | Giles .......................... 248/545 |
| D324,009 S | | 2/1992 | Smith |
| 5,123,623 A | * | 6/1992 | McNamara ................. 248/545 |
| D337,083 S | | 7/1993 | Rankin |
| 5,238,125 A | * | 8/1993 | Smith ............................ 211/5 |
| D341,342 S | | 11/1993 | Pook |
| D341,348 S | | 11/1993 | Williams |
| D367,022 S | | 2/1996 | Graber |
| D369,131 S | | 4/1996 | Smith |
| D369,332 S | | 4/1996 | Smith |
| D369,585 S | | 5/1996 | Gregory |
| D372,889 S | | 8/1996 | Fox |
| D374,849 S | | 10/1996 | Chipman |
| 5,636,754 A | * | 6/1997 | Ennis ........................ 211/70.2 |
| 5,661,925 A | | 9/1997 | MacMaster |
| D385,231 S | | 10/1997 | Skalka |
| D391,529 S | | 3/1998 | Skalka |
| D391,903 S | | 3/1998 | Pappas |
| D398,268 S | | 9/1998 | Woodcock |
| 5,802,889 A | * | 9/1998 | Arnold .......................... 70/18 |
| 5,813,259 A | | 9/1998 | Martin |
| D408,763 S | | 4/1999 | Graber |
| D408,764 S | | 4/1999 | Graber |
| D409,118 S | | 5/1999 | Graber |
| D409,134 S | | 5/1999 | Will |
| D437,164 S | | 2/2001 | Fickett |
| 6,223,907 B1 | | 5/2001 | Graber |
| 6,257,419 B1 | | 7/2001 | Kamysiak |
| D447,723 S | | 9/2001 | Spangler |
| D449,256 S | | 10/2001 | Kopacz |
| 6,539,759 B2 | * | 4/2003 | Pershall ....................... 70/234 |
| D477,255 S | * | 7/2003 | Saez ......................... D12/115 |

* cited by examiner

FIG. 12              FIG. 13

BICYCLE LOCKING STAND THAT PREVENTS DAMAGE TO URBAN TREES

CROSS REFERENCE TO RELATED APPLICATION(S)/CLAIM OF PRIORITY

This is a nonprovisional utility patent application that is also described and claimed as an ornamental design of my invention in a concurrently filed design patent application entitled BICYCLE LOCKING STAND.

STATEMENT REGARDING FEDERALLY SPONSORED RESEARCH OR DEVELOPMENT

Not applicable.

BACKGROUND

Field of the Invention

This invention is an implementation of a method that is the subject of a nonprovisional utility patent application filed by Barbara Eber-Schmid entitled METHOD OF PROTECTING URBAN PLANTED TREES FROM PARKED BICYCLES AND OTHER VEHICLES. Said nonprovisional utility patent application was filed concurrently with this patent application for my invention that is described herein. Both applications and the inventions described therein are commonly owned by the NYC Street Tree Consortium, Inc. (a.k.a. TREES NEW YORK). Funding for the development of the invention described herein was provided by TREES NEW YORK.

This invention relates to a modular bicycle rack used for parking bicycles in urban areas in order to prevent bicycle theft. It can be used as a stand-alone bicycle park-and-lock stand. However, it is intended primarily for use in combination with other such modules such that the plurality of said modules combine to surround and protect urban planted trees from damage to their trunks from bicycles that lean against the trees or from locking devices that attach to the trees. Since tree planting on city streets is necessary for protection of the urban environment, this invention insures that the trees, and therefore the environment, will remain safe. Furthermore, with this invention several bicycles can be parked around a single tree. The availability of secure bicycle parking on city streets further promotes the use of bicycles for transportation in place of automobiles. Encouraging the use of bicycles for transportation is also helpful to the environment as it decreases pollution from air emissions from automobile exhausts.

BACKGROUND OF THE INVENTION

Bicycles have been an important mode of transportation for both commercial and recreational purposes since the mid-nineteenth century. In some countries, they have been the principal mode of private transportation for average citizens. This is the case in cities like Amsterdam (the Netherlands) and Beijing (the Peoples Republic of China). In the United States, motor vehicles represent the principal mode of private transportation. However, a significant number of bicycles are used. Most cities and towns in the United States provide curbside or angle parking for motor vehicles. In order to prevent theft of a parked motor vehicle, the vehicle owner need only remove the key and lock the car. Although many cars are nonetheless stolen, motor vehicle theft is somewhat difficult since cars are heavy and not very portable. Bicycles are much easier to steal. A thief need merely pick up a parked bicycle and carry it away. To keep their parked bicycles safe from bicycle thieves, owners often attach their bikes securely to immobile objects using commercially available locking devices. Many municipalities, universities, and other public property owners provide conveniently situated bicycle racks to accommodate bike riders. However, except for a small number of urban locations, public bicycle racks are few and far between. Therefore, it is not uncommon to see bicycles chained to stop signs, lamp posts, and metal fences on city streets. In fact, bike riders are very creative in choosing an immobile object that would accommodate a locked parked bicycle. Urban planted trees present excellent opportunities to bicycle riders that seek parking spaces. Unfortunately, the metal from bicycles and their locking devices (e.g., chains) cause damage to tree trunks that are more fragile than they appear. Many trees ultimately die from such abuse.

Since the late nineteenth century, tree guards have been used to protect tree trunks from damage. These usually take the form of wrought iron grillwork that surround the tree trunks. They are normally permanently mounted around the tree while the tree is still a sapling since a tree is most vulnerable when it is young. As time passes, the diameter of a tree trunk increases until the metal from the tree guard itself can damage and ultimately strangle the tree. In any event, there is often very little space between the metal from the tree guard and the trunk of a mature tree. Trees surrounded by tree guards do not make very good places to park bicycles.

To protect urban trees from damage by bicycles and other vehicles, planners often plant trees inside soil beds surrounded by brick or cement wells. Clearly, one cannot park and lock a bicycle at such a location. Sometimes a small wrought iron fence would protrude from the stone structure surrounding the tree bed, and such an extension could facilitate bicycle parking. However, such structures are often expensive and unsightly.

Barbara Eber-Schmid conceived of a method to both protect urban planted trees from parked bicycles and, at the same time, to provide the location of said trees as a welcoming site for bicycle parking. Her method utilizes a plurality of modular bicycle racks or bicycle locking stands to surround a tree in such a manner as to prevent a bicycle from having access to the tree. The modular bicycle locking stands are firmly anchored to the ground surrounding said tree sufficiently far away as not to cause damage themselves to any element of the tree such as the tree trunk or roots. Said plurality of modular bicycle locking stands present to bicycle owners a much larger perimeter than the circumference of the tree trunk and permit a plurality of bicycles to be parked in the vicinity of a single tree.

Modular bicycle park-and-lock stands of varying designs and constructions are in use in cities and towns around the world. A number of countries have granted patents to inventors for such devices. Most of the patents for bicycle racks have been granted in the United States. Of these, most are design patents that protect the ornamental design of the bicycle racks rather than their functionality or construction. A companion design patent application for the bicycle rack described herein has been concurrently filed with the United States Patent and Trademark Office. A search of the prior art, both patent and non-patent, did not reveal any reference or combination of references that teaches the construction of modular bicycle racks or the use thereof for providing, at the location of an urban planted tree, theft resistant parking of bicycles, providing a park-and-lock station for a plurality of bicycles, and, at the same time, providing protection for said tree.

SUMMARY OF THE INVENTION

The invention described herein is for a modular bicycle locking stand that can be firmly anchored to the ground and used in stand-alone mode for parking and locking bicycles in urban and suburban areas. It can be used in combination with other modular bicycle locking stands of the same construction or of different construction so that the plurality of said modules provides a convenient, compact, and attractive park-and-lock facility in urban and suburban areas. Furthermore, a plurality of said modules can be used to surround a tree (or a plurality of trees) in such a manner as both to provide theft-resistant parking for a plurality of bicycles and to prevent bicycles from being either leaned against or attached directly to said tree (or plurality of trees).

BRIEF DESCRIPTION OF THE DRAWINGS

FIG. 9 is a schematic showing how a plurality of modules are combined to surround a tree.

FIG. 10(a) is a front elevational view.

FIG. 10(b) is a right side elevational view.

FIG. 10(c) is a top plan view.

FIG. 11(a) is a front elevational view.

FIG. 11(b) is a right side elevational view.

FIG. 11(c) is a top plan view.

DETAILED DESCRIPTION OF THE PREFERRED AND ALTERNATE EMBODIMENTS

The construction of the bicycle locking stand or module described herein is entirely of metal that is rigid. It is firmly anchored to the ground in such a manner as to be virtually immobile and unbreakable. It is comprised of three essential elements:

an upper torus or upper toroidal member;

a lower semi-torus or lower semi-toroidal member; and two anchoring members or shoes.

Figure 1:
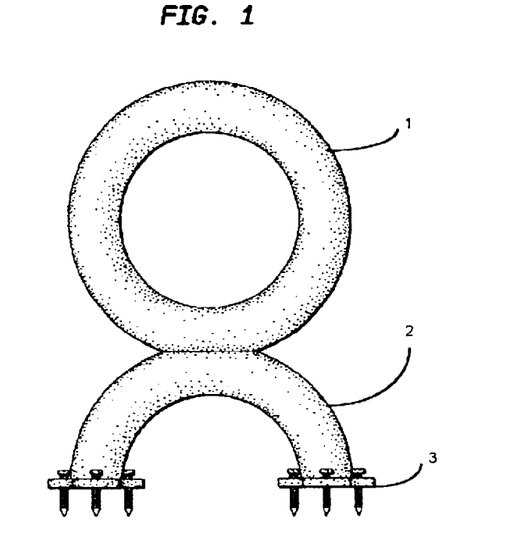
FIG. 1 is a front elevational view of the bicycle locking stand module of this invention. This view is identical to a rear elevational view thereof.
Figure 2:
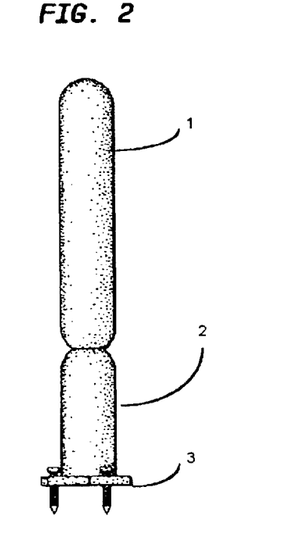
FIG. 2 is a right side elevational view thereof. This view is identical to a left side elevational view thereof.
Figure 3:
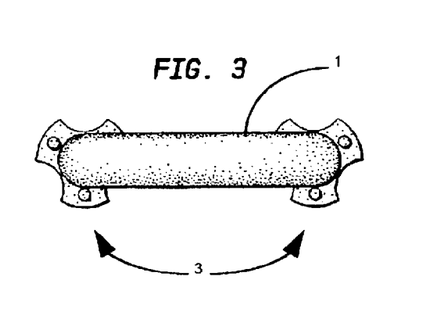
FIG. 3 is a top plan view thereof.
Figure 4:
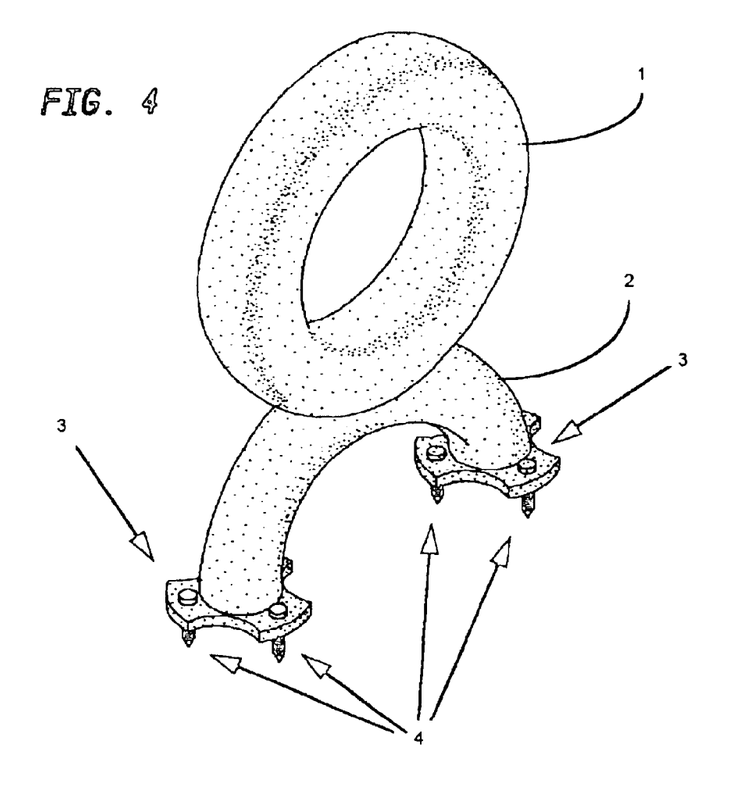
FIG. 4 is an isometric view thereof The viewer is positioned diagonally to the left of the module observing the front of the module.
Figure 5:
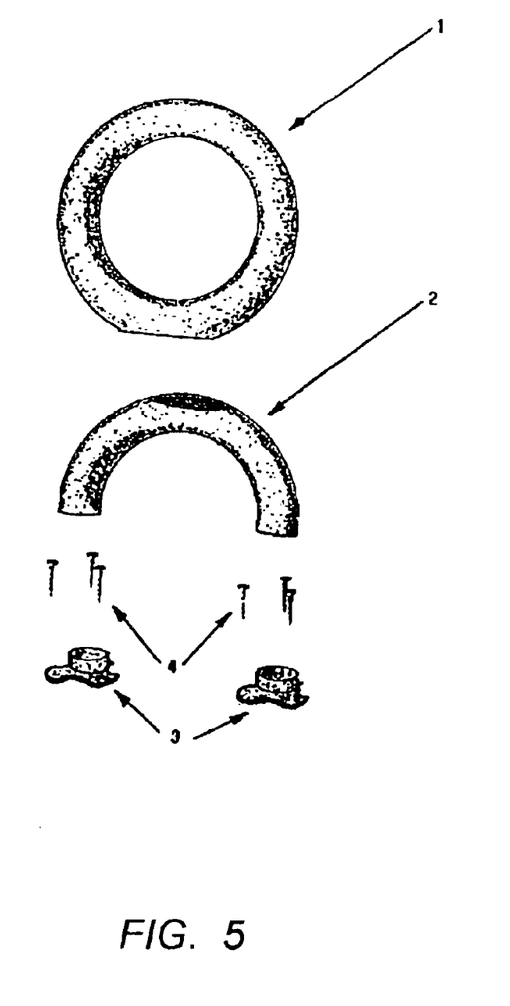
FIG. 5 is an exploded view showing the components of the bicycle locking stand module of this invention.
Figure 6:
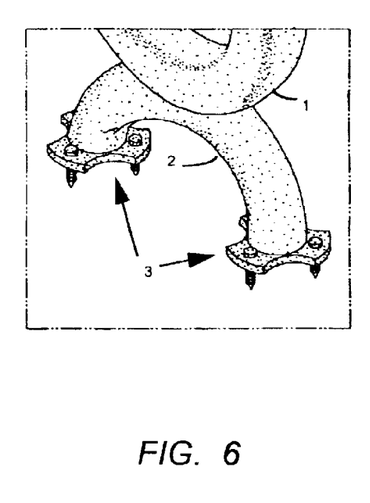
FIG. 6 is an isometric view showing the bottom portion of the module. The viewer is positioned diagonally to the right of the module, and is observing the module from above.
Figure 7:
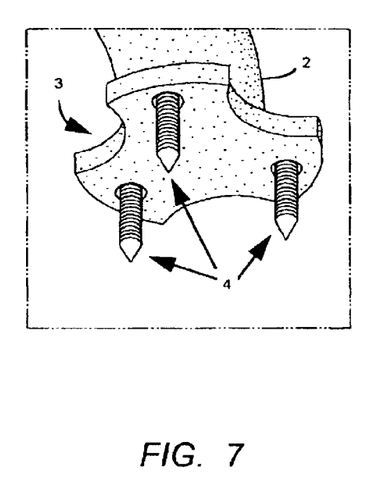
FIG. 7 is an isometric view showing the anchoring member or shoe of the module. The observer is observing the shoe from the bottom. Both shoes are identical.

The upper toroidal member and the lower semi-toroidal member can be either of solid or hollow construction, and said construction of said members can either be the same or different for each element All three elements may be constructed from the same metal or alloy or separately of different metals or alloys. In the preferred embodiment, the elements are constructed from a rust resistant or rust preventative metal or metal alloy. The technology of such metallic substances is well known. All three elements are securely attached to each other either by welding or other fastening means so that the module remains as a single inseparable unit. The arrangement of the elements of the module is shown in FIGS. 1, 2, and 3. FIG. 1 is a front elevational view; FIG. 2 is a right side elevational view; and, FIG. 3 is a top plan view of the assembled module. Upper toroidal member, 1, is securely attached to lower semi-toroidal member, 2, which is securely attached to the two shoes, 3. Each shoe, 3, is constructed of solid metal. In the preferred embodiment a shoe is constructed from a circular metal plate. In the embodiment shown in the drawings, three circular or elliptical sections are carved out from the circular metal plate and three holes are drilled in the plate to be used for the insertion of screws, bolts, or studs. However, the shoe can remain as a completely circular shape, and more than three screws, bolts, or studs may be used. Furthermore, the shoe may have any polygonal shape, said polygonal shape providing for use of any number of screws, bolts, or studs. The cross sections of upper toroidal member, 1, and lower semi-toroidal member, 2, in either direction can be either circular or elliptical. FIG. 4 is an isometric view of the fully assembled module that shows schematically how three screws, bolts, or studs, 4, are inserted into the three holes of each shoe, 3. Once again, this view shows the assembled arrangement of upper toroidal member, 1, lower semi-toroidal member, 2, and the two shoes, 3. FIG. 5 is an exploded view of the module assembly showing the relative positions of upper toroidal member, 1, lower semi-toroidal member, 2, the two shoes, 3, and the six screws, bolts, or studs 4. FIG. 6 is an isometric view of the bottom portion of the module as seen from above and from the right. Only portions of upper toroidal member, 1, and lower semi-toroidal member, 2, are shown. However, the shapes of the shoes, 3, for this embodiment are evident. FIG. 7 is another isometric view that shows both the relationship of shoe, 3, to the lower semi-toroidal member, 2, and the insertion of the three screws, 4, into the holes drilled in the shoe.

In the preferred embodiment, the upper toroidal member, 1, is constructed by bending a metal tube into shape while white hot and joined at both ends by electrical welding. The lower semi-toroidal member, 2, is constructed in the same manner as the upper toroidal member, 1, but sawed in half. The two members, 1 and 2, are then joined together with electrical welding. The two shoes, 3, are attached to the bottom of the modular structure as shown using electrical welding. The screws, studs, or bolts, 4, should be made of stainless steel and should have a screw head that, once placed in the ground, would not be subject to removal by vandals.

Figure 8:
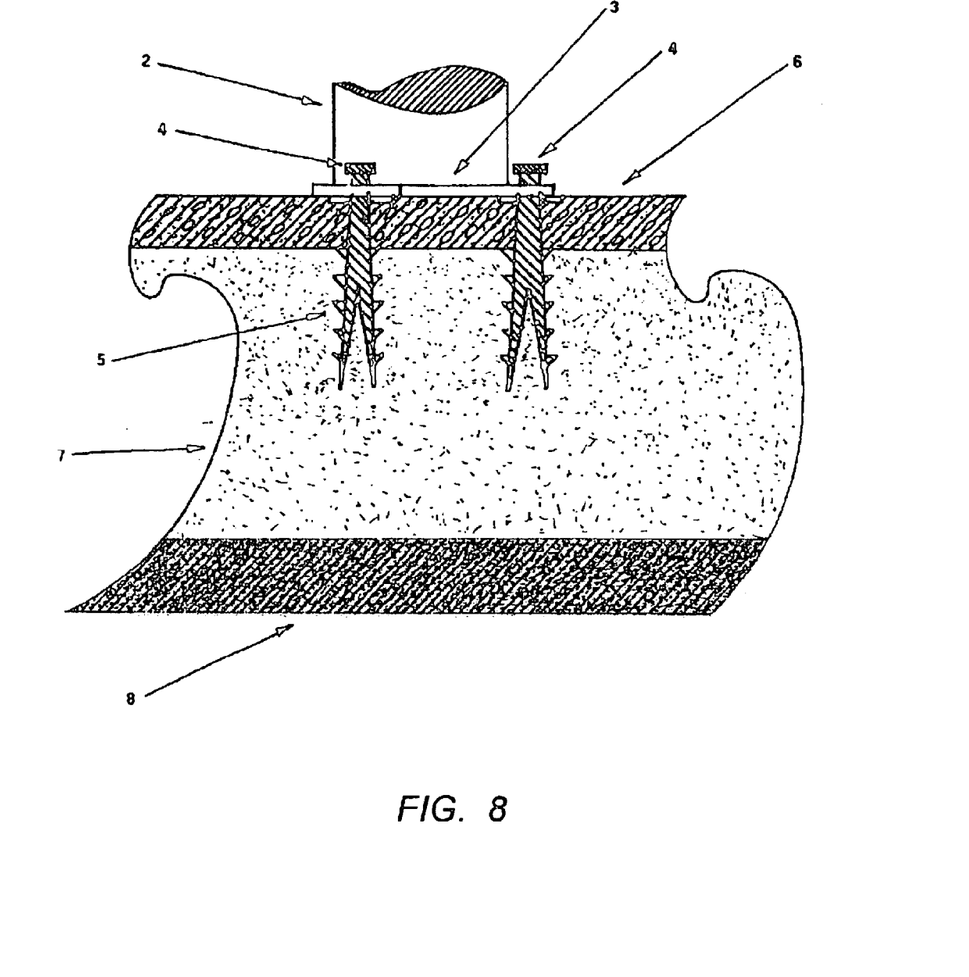
FIG. 8 is a cross sectional view showing how the module can be anchored to the ground.
Figure 9A:
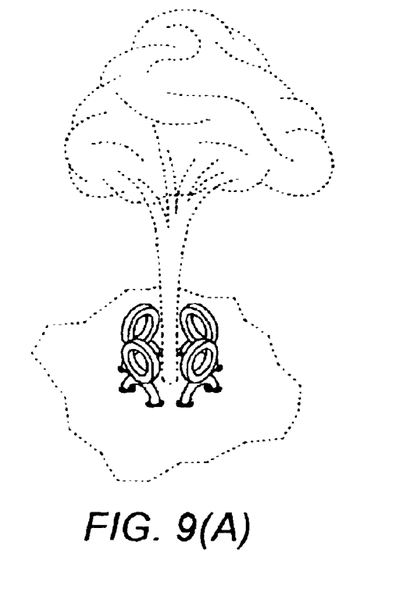
FIG. 9(A) shows four modules.
Figure 9B:
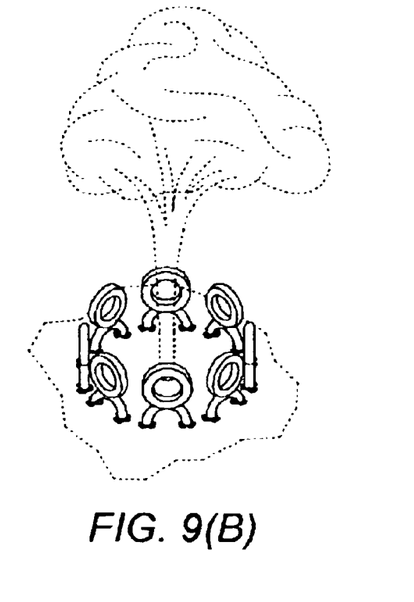
FIG. 9(B) shows eight modules.
Figure 9C:
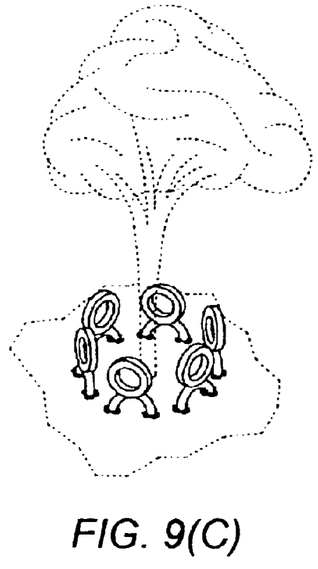
FIG. 9(C) and FIG. 9(D) each show six modules.
Figure 9D:
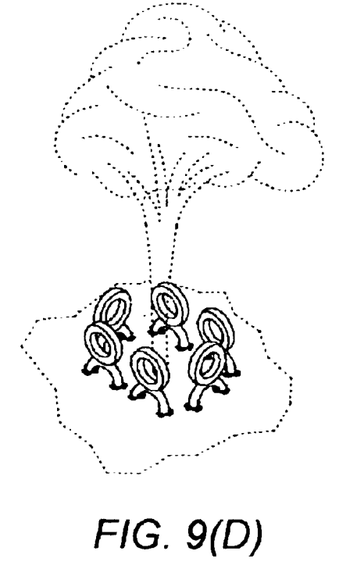

FIG. 8 is a cross sectional schematic view showing how the module can be anchored to the ground. Only a portion of lower semi-toroidal member, 2, is shown, and only one shoe, 3, is visible in the figure. Cement floor, 6, rests atop floor reinforcement material, 7, which, in turn rests atop dirt or earth, 8. The floor reinforcement material, 7, can be constructed from wood, plastic, reinforced concrete, or any other material that will enable cement floor, 6, to rest atop dirt, 8, so that the entire modular assembly once anchored would be immobile. Alternatively, sections 6 and 7 can be combined to form a single reinforced concrete element in the event that the structure needs to be placed directly on dirt. In that event, a concrete cube would provide structural support. In the figure, screws, 4, are inserted into the holes of shoe, 3, into anchors, 5, that expand when the screws are inserted so as to prevent removal of the module. Installation is accomplished by:

1. placing the module structure on the ground, marking the holes, removing the structure and drilling the holes into the cement or concrete floor;
2. inserting anchors into said holes in the cement or concrete floor, and,
3. setting the structure in place and driving in the screws. Six screws, three on each leg will provide a steady structural support. The entire installation procedure should take approximately ten minutes. The approximate cost of the module plus installation is $150.

It is anticipated that a bicycle can be attached to the modules using a locking device, such as a chain and lock or any other commercially available locking device, either to secure the bicycle frame to the upper toroidal member, 1, or to secure the bicycle frame or wheel assembly to the lower semi-toroidal member, 2. The modules may be used in stand-alone mode or may be used to create a bicycle park-and-lock station consisting of a plurality of said modules. One arrangement of a plurality of said modules can be where the modules are lined up along a curb so that a viewer facing traffic would see a plurality of modules each appearing as shown in FIG. 1. Another arrangement of a plurality of said modules can be where the modules are lined up parallel to one another so that a straight line may be drawn connecting the centers of the circles (or ellipses) formed by the upper toroidal members. In this case, a viewer would see a plurality of modules arranged side-by-side, and appearing as shown in FIG. 2.

FIG. 9 shows how a plurality of modules can be used to surround and protect a tree. FIG. 9(A) shows four modules being used for this purpose. FIG. 9(B) shows eight modules being used. FIGS. 9(C) and (D) each show six modules being used. If a tree is planted by a curb, it is possible to use only three modules, since it is not anticipated that a bicycle would be parked in the street instead of on the sidewalk. For this arrangement, the three modules would be parked relatively close to the tree and perpendicular to each other. There would not be a module situated on the curb facing traffic. The module farthest away from the curb would be mounted parallel to the curb, while the two-side modules would be mounted on either side of the tree and perpendicular to the curb. The three modules would be mounted close enough to each other so as to prevent a bicycle from being attached to the tree from the street side and also as to prevent a car door from hitting the tree when it is opened. The construction of the modules is not designed to prevent dogs or other animals or even people from having access to the trees. The size of each unit makes it ideal for modular use. Different sized tree pits can be successfully protected by varying the arrangement and number of modules used.

Figure 10:
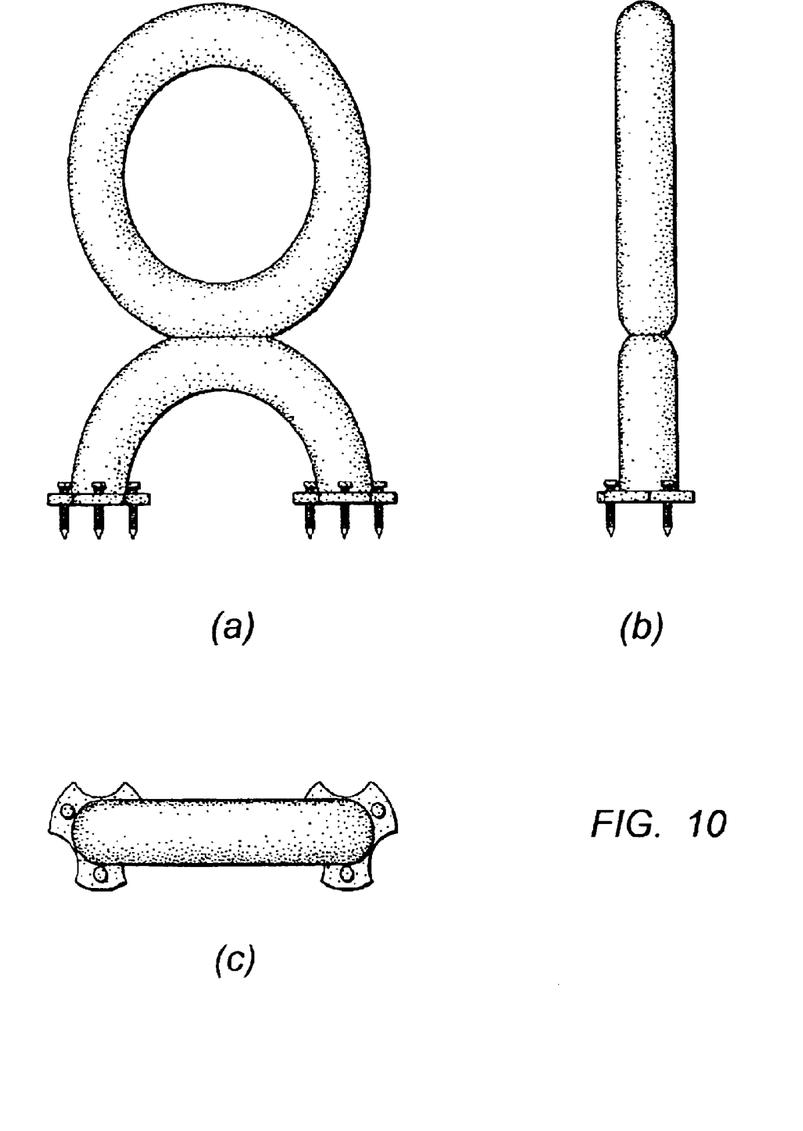
FIG. 10 shows the bicycle stand having an elliptical cross section elongated in the vertical direction.
Figure 11:
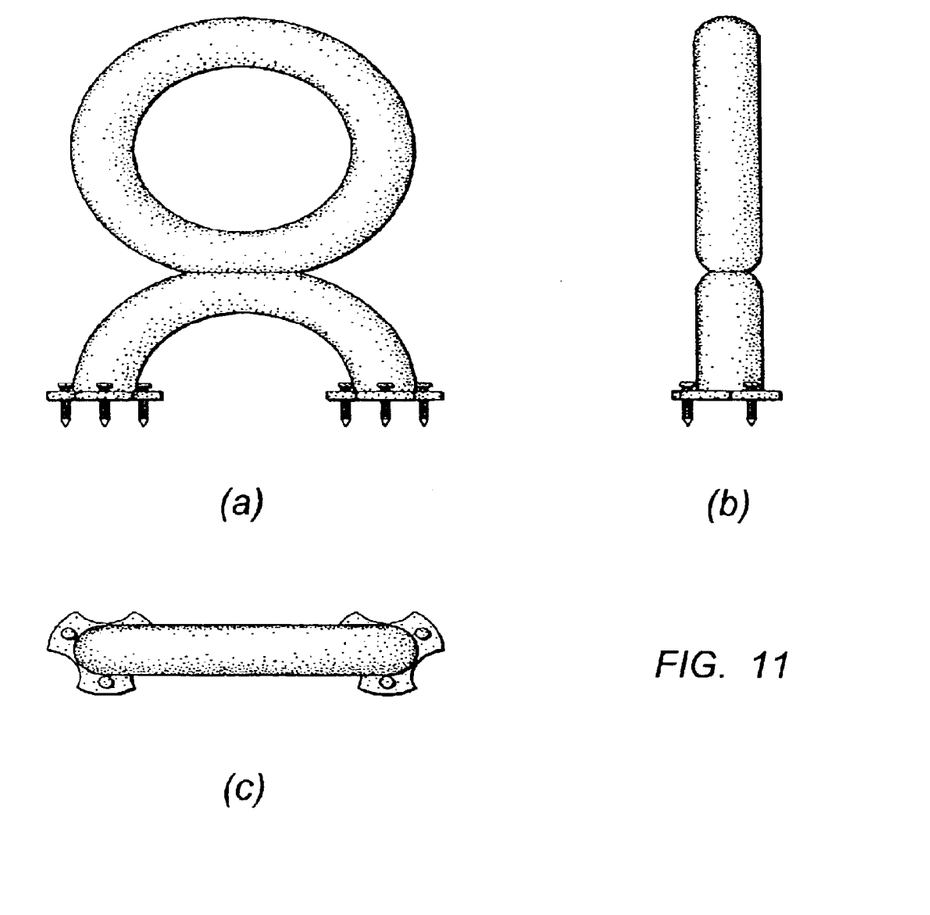
FIG. 11 shows the bicycle stand having an elliptical cross section elongated in the horizontal direction.
Figure 12:
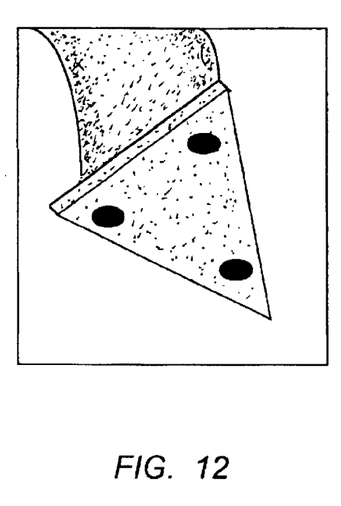
FIG. 12 is an isometric view showing the bottom of the module. The shoe in the figure is a flat plate having a triangular shape.
Figure 13:
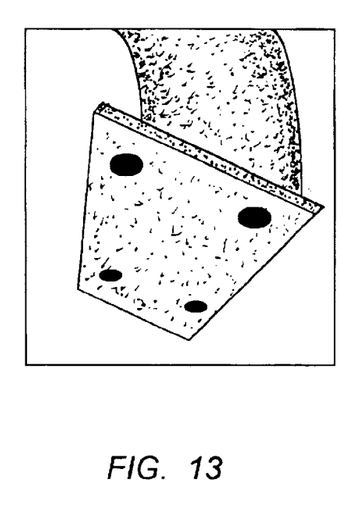
FIG. 13 is an isometric view showing the bottom of the module. The shoe in the figure is a flat plate having a rectangular shape.

FIGS. 10 and 11 show the modular bicycle stand having an elliptical cross section. FIG. 10 shows the stand elongated in the vertical direction while FIG. 11 shows the stand elongated in the horizontal direction. The orientation of elliptical upper and lower members is not limited to being only vertical or horizontal. FIGS. 12 and 13 show some alternate shapes for the shoes. FIG. 12 shows a shoe that is a flat triangular plate while FIG. 13 shows a shoe that is a flat rectangular plate. Other alternate shapes are possible.

I claim the following:

1. A modular bicycle stand for securely attaching a bicycle with a locking device, the stand comprising:
   a single ring shaped top member for attaching the bicycle thereto;
   a single semi-ring shaped bottom member attached securely below the top member, wherein said bottom member has two ends for mounting to the ground so that the bicycle stand can maintain an upright position; and,
   two shoe members for anchoring the bicycle stand to the ground so as to make it immobile, each shoe member being attached securely to each of the two ends of the bottom member, respectively.

2. The bicycle stand of claim 1 wherein said top member is a torus having an outer circumference.

3. The bicycle stand of claim 2 wherein said top member has a cross section in any direction that is circular.

4. The bicycle stand of claim 2 wherein said top member has a cross section in any direction that is elliptical.

5. The bicycle stand of claim 2 wherein said top member is hollow.

6. The bicycle stand of claim 2 wherein said top member is solid.

7. The bicycle stand of claim 2 wherein the bottom member is a semi-torus having an outer circumference, said semi-torus being securely fastened to the torus at the outer circumference of said semi-torus, and wherein the two shoe members are flat members that are securely fastened at the bottom of said semi-torus.

8. The bicycle stand of claim 7 wherein said bottom member has a cross section in any direction that is at least partially circular.

9. The bicycle stand of claim 7 wherein said bottom member has a cross section in any direction that is at least partially elliptical.

10. The bicycle stand of claim 7 wherein said bottom member is hollow.

11. The bicycle stand of claim 7 wherein said bottom member is solid.

12. The bicycle stand of claim 1 wherein each shoe member is comprised of a flat metal plate into which a plurality of holes to accept screws, bolts, or studs are drilled, said metal plates being securely fastened to the ends of the bottom member of the bicycle stand.

13. The bicycle stand of claim 12 wherein said plurality of holes drilled in each said flat metal plate is three in number.

14. The bicycle stand of claim 12 wherein said flat metal plates are circular plates.

15. The bicycle stand of claim 14 wherein circular or elliptical sections are cut away from said circular plates.

16. The bicycle stand of claim 15 wherein the number of said circular or elliptical cut away sections for each circular plate is three in number.

17. The bicycle stand of claim 12 wherein said flat metal plates are triangular plates.

18. The bicycle stand of claim 12 wherein said flat metal plates are plates in the shape of a polygon with four or more sides.

19. A method of protecting a tree from damage by parked bicycles comprised of surrounding said tree with a plurality of the bicycle stands of claim 12 anchored to the ground so as to be immobile in such a manner as to prevent said bicycles from being leaned against said tree or attached to said tree using a locking device.

20. The method of claim 19 wherein three or more said bicycle stands are used.

21. A method of protecting a tree from damage by parked bicycles comprised of surrounding said tree with a plurality of the bicycle stands of claim 1 anchored to the ground so as to be immobile in such a manner as to prevent said bicycles from being leaned against said tree or attached to said tree using a locking device.

22. The method of claim 21 wherein three or more said bicycle stands are used.

23. The modular bicycle stand of claim 1 wherein the top member is formed from a metal pipe, rod, or tube.

24. The modular bicycle stand of claim 1 wherein the bottom member is formed from a metal pipe, rod, or tube.

25. The modular bicycle stand of claim 1 further comprising a means for securing the shoe members of said bicycle stand to the ground so as to make the bicycle stand immobile.

26. The modular bicycle stand of claim 25 wherein the means for securing said bicycle stand to the ground comprises:

screws, bolts, or studs and anchors to fasten said shoe members to the ground; and, a hard, solid, secure, and immobile surface to which the bicycle stand is secured, said surface resting on top of the ground.

27. The bicycle stand of claim 26 wherein said hard, solid, secure, and immobile surface is a cement floor bonded to a floor reinforcement material.

28. The bicycle stand of claim 27 wherein said floor reinforcement material is reinforced concrete, wood, or plastic.

29. The bicycle stand of claim 26 wherein said hard, solid, secure, and immobile surface is a solid block of reinforced concrete.

* * * * *